(12) United States Patent
Sampson et al.

(10) Patent No.: US 10,904,057 B1
(45) Date of Patent: Jan. 26, 2021

(54) DITHERING OF WAVEFORM SAMPLES USING A SET OF TIME DILATION FUNCTIONS FOR SUPPRESSING THE FEATURES TO ENHANCE LPI/LPD PROPERTIES

(71) Applicant: Northrop Grumman Systems Corporation, Falls Church, VA (US)

(72) Inventors: John B. Sampson, Madeira, OH (US); Ameesh N. Pandya, Los Angeles, CA (US); Yen M. Hoang, Anaheim, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 16/890,295

(22) Filed: Jun. 2, 2020

(51) Int. Cl.
| | | |
|---|---|---|
| *H04B 1/00* | (2006.01) | |
| *H04L 27/20* | (2006.01) | |
| *H04L 27/22* | (2006.01) | |
| *H04L 7/00* | (2006.01) | |

(52) U.S. Cl.
CPC ........ *H04L 27/2092* (2013.01); *H04L 7/0041* (2013.01)

(58) Field of Classification Search
CPC .......................... H04L 27/2092; H04L 7/0041
See application file for complete search history.

(56) References Cited

U.S. PATENT DOCUMENTS

| | | | | |
|---|---|---|---|---|
| 4,758,893 A | * | 7/1988 | Lippel | H04N 5/9261 348/472 |
| 5,574,451 A | * | 11/1996 | Borgen | H03M 1/0641 341/110 |
| 6,388,595 B1 | * | 5/2002 | Edwards | G01R 13/0272 341/131 |
| 7,069,590 B1 | * | 6/2006 | Malvar | H04K 1/02 348/E7.056 |
| 9,264,065 B2 | | 2/2016 | Prince | |

OTHER PUBLICATIONS

J. E. Thompson et al. "A Pseudo-Random Quantizer for Television Signals" Mar. 1967, IEEE, vol. 55, No. 3, pp. 353-355.*

* cited by examiner

*Primary Examiner* — Tesfaldet Bocure
(74) *Attorney, Agent, or Firm* — John A. Miller; Shumaker, Loop & Kendrick, LLP

(57) ABSTRACT

A communications system including a transmitter having a modulator that converts information bits to samples, a transmitter pseudo random number generator that generates a sequence of transmitter random numbers defining a time dilation function, and a transmitter time varying delay processor responsive to the samples and the time dilation function, where the transmitter time varying delay processor dithers the samples in time based on the time dilation function. The system also includes a receiver responsive to the dithered samples from the transmitter, where the receiver includes a receiver pseudo random number generator that generates a sequence of receiver random numbers in sync with the transmitter random numbers, a receiver time varying delay processor responsive to the receiver random numbers and the dithered samples, where the receiver time varying delay processor removes the dithering of the samples, and a demodulator for demodulating the samples to recover the information bits.

20 Claims, 5 Drawing Sheets

DITHERING OF WAVEFORM SAMPLES USING A SET OF TIME DILATION FUNCTIONS FOR SUPPRESSING THE FEATURES TO ENHANCE LPI/LPD PROPERTIES

BACKGROUND

Field

This disclosure relates generally to a communications system that employs a time dilation function that dithers the samples that define a transmitted waveform to prevent cyclostationary detection of the waveform and, more particularly, to a communications system that employs a time dilation function that dithers the samples that define a transmitted waveform in a pseudo random manner so that they occur at different times to prevent cyclostationary detection of the waveform.

Discussion of the Related Art

Digital communications systems typically map or translate a stream of encoded information bits to be transmitted into a constellation of symbols, where each symbol defines a group of the bits. For example, a bit mapper may employ M-ary phase shift keying (M-PSK) that provides in-phase and quadrature-phase components for each symbol that is transmitted. The mapped symbols are then modulated onto a waveform, filtered and converted to an analog signal for transmission. When the analog signal is received by a receiver, the signal is converted to a digital signal to remove the carrier and the digital signal is demodulated to recover the symbols, which requires knowledge of the time position of the individual symbols in the signal to correctly determine the value of each symbol. The information bits are then extracted from the symbols.

For certain applications, it is desirable to transmit a data or communications signal without that signal being detected by someone else, such as an adversary, i.e., the adversary does not know that a signal is being transmitted, typically for various low probability of interception/low probability of detection (LPI/LPD) communications applications. Anyone attempting to determine that a signal is being transmitted will typically use a radiometer or energy detector that looks for high power against the background over certain frequency bands. However, many things could cause higher power over the background, and thus the mere identification of higher power at a certain frequency band is not always an indication that there is a signal being transmitted over that band.

Improvements in detecting that signals are being transmitted has led to cyclostationary techniques for detecting a signal, which look at the statistical properties of the energy in a certain frequency band to estimate the transmitted signal's periodicity characteristics such as carrier frequency, symbol time and modulation mode. In other words, cyclostationary techniques look for statistical properties of signals that cyclically vary with time. Thus, because these types of signals are usually transmitted at a constant symbol rate or at a constant carrier frequency they are often easily detectable by this type of cyclostationary analysis.

Known attempts to reduce the ability of a signal to be detected by cyclostationary techniques often use some type of process that varies the frequency, such as frequency hopping, or changing the symbol rate over time so that the statistical properties of the data are varied. However, these techniques require that the transmission hardware, such as sophisticated modems, be modified so that the signals have a constantly changing frequency and symbol rate, which increases cost and complexity. Further, existing techniques only vary the symbol rate over a finite set of values, which still allows the signal to be detected.

DETAILED DESCRIPTION OF THE EMBODIMENTS

The following discussion of the embodiments of the disclosure directed to a communications that employs a time dilation function that dithers the samples that define a transmitted waveform in a pseudo random manner so that they occur at different times to prevent cyclostationary detection of the waveform is merely exemplary in nature, and is in no way intended to limit the disclosure or its applications or uses.

As will be discussed in detail below, this disclosure describes a technique that modifies the waveform of a signal being transmitted so that it is not detectable by a cyclostationary detector, where the technique is provided by a device that can be attached to the output of existing communications modems. The proposed technique is referred to as time dilation and includes dithering the samples that define a transmitted waveform in a pseudo random manner so that they occur at different times, where the waveform could be any transmitted waveform, such as an analog waveform, a digital waveform, audio waveform, video waveform, etc., and the samples could be defined in any suitable manner, such as a group of bits or a symbol, which decreases its ability to be detected. In other words, the time dilation adjusts the samples of an arbitrary waveform to new values that correspond to a pseudo-randomly varying time offset. The pseudo-random time offset is generated by filtering the output of a random number generator. The process can be reversed by applying the inverse time offset waveform. When applied to a communications waveform such as QPSK, time dilation greatly attenuates second-order cyclostationary features used by threats to detect and classify signals. Further, when time dilation is applied, demodulation of the signal is impossible without an inverse time dilation function. Thus, time dilation can be considered as a physical layer security feature and protects against exploitation. In addition, time dilation is agnostic to waveform.

Figure 1:
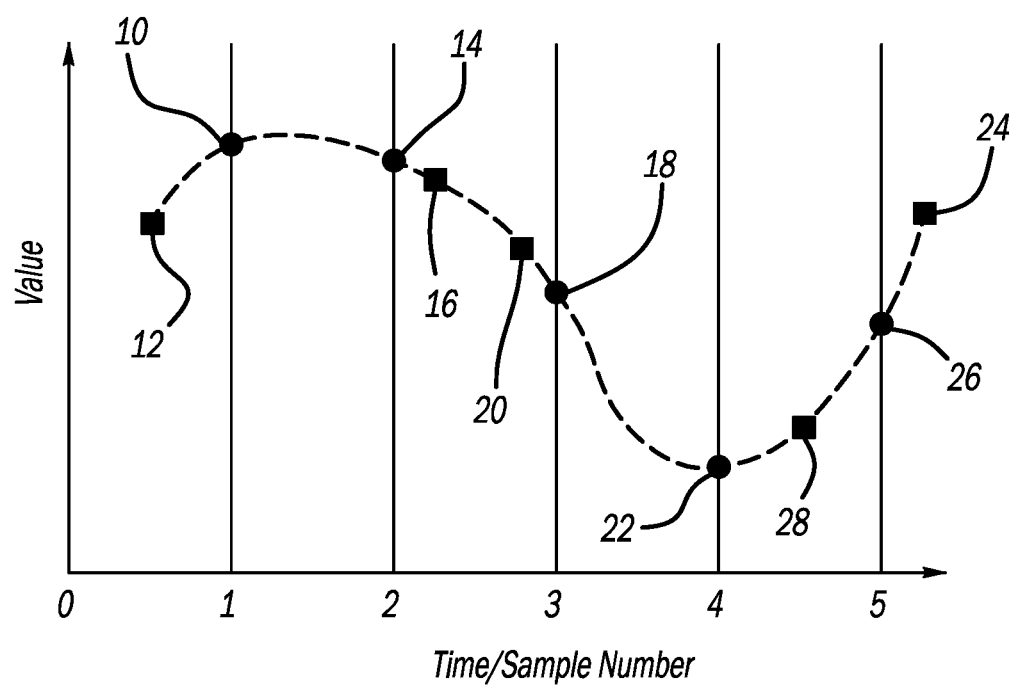
FIG. 1 is a graph with time or sample number on the horizontal axis and sample value on the vertical axis.

This technique is generally illustrated by the graph of FIG. 1, where time or sample number is on the horizontal axis and the sample value is on the vertical axis. The digital samples that are generated by the transmitter to be transmitted occur at consistent time intervals as represented by the circles and the time dilation technique modifies or dithers those times for each sample in a pseudo random manner as represented by the squares by polynomial interpolation. In this example, sample 10 is modified with a time dilation of −0.5 and an interpolation point of 0.5 as modified sample 12, sample 14 is modified with a time dilation of 0.25 and an interpolation point of 2.25 as modified sample 16, sample 18 is modified with a time dilation of −0.25 and an interpolation point of 2.75 as modified sample 20, sample 22 is modified with a time dilation of 1.25 and an interpolation point of 5.25 as modified sample 24, and sample 26 is modified with a time dilation of −0.5 and an interpolation point of 4.5 as modified sample 28. The table or operation that defines the time dilation for each sample in the transmitter is known by the receiver so that it can apply the reverse of the time dilation to each sample and recover the original time of the samples.

Figure 2:
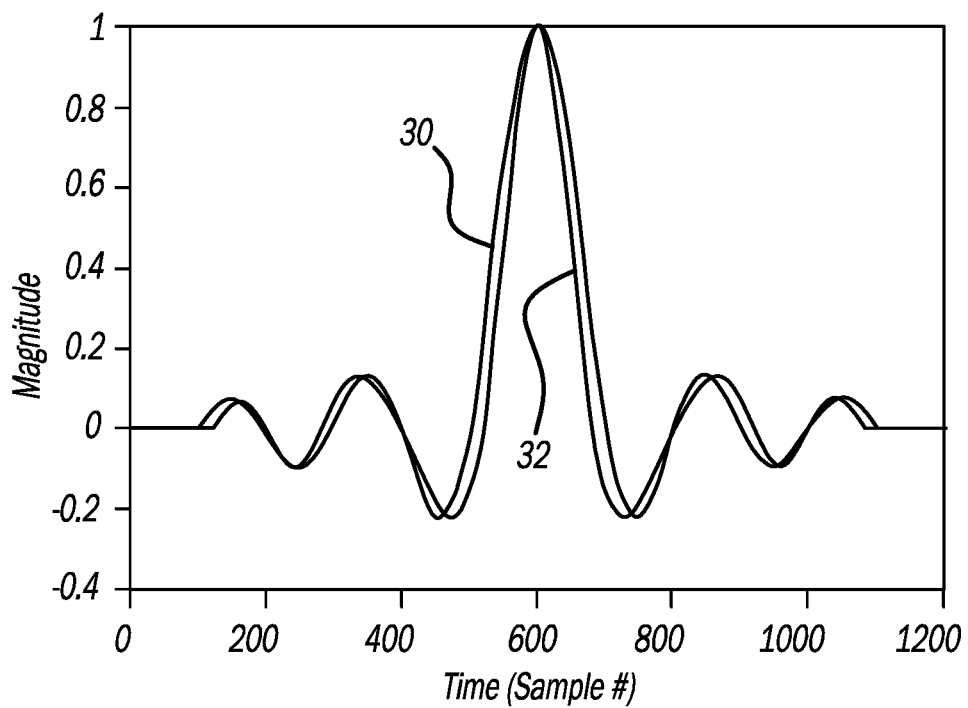
FIG. 2 is a graph with time on the horizontal axis and magnitude on the vertical axis illustrating time dilation of a sinc function waveform.

FIG. 2 is a graph with time on the horizontal axis and magnitude on the vertical axis illustrating time dilation of a sinc function waveform, where the original waveform is shown by graph line 30 and the dilated waveform is shown by graph line 32 with the same duration. As is apparent, there is no change in the magnitude of the waveform after it is time dilated, just a shift in time.

Figure 3:
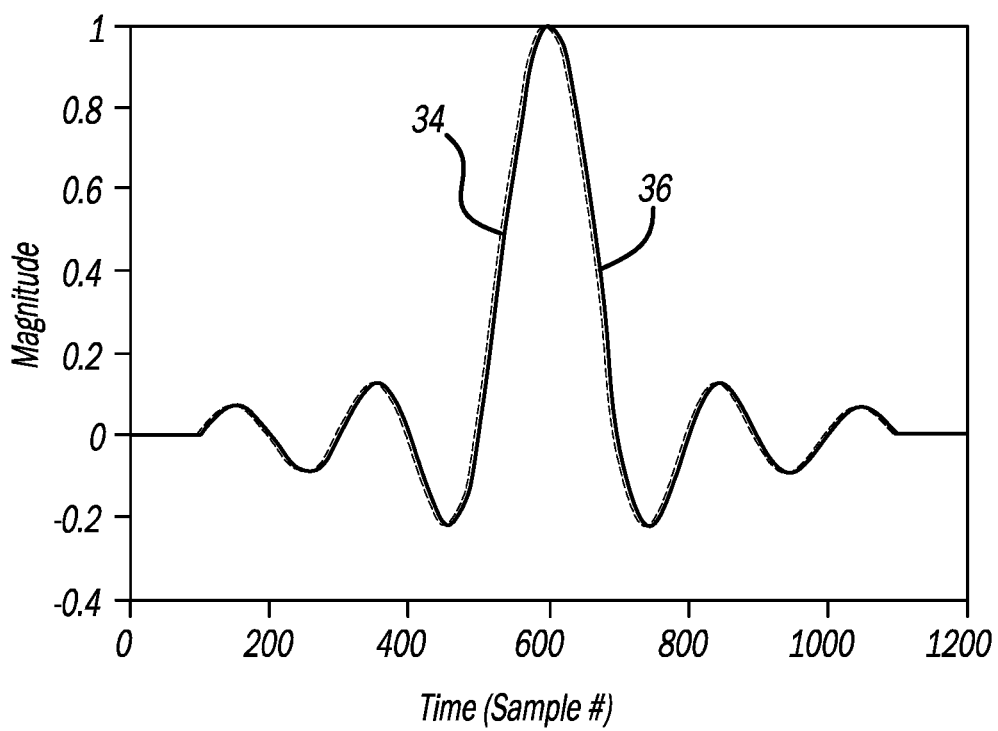
FIG. 3 is a graph with time on the horizontal axis and magnitude on the vertical axis illustrating the original and recovered time dilation of a sinc function waveform.

FIG. 3 is a graph with time on the horizontal axis and magnitude on the vertical axis illustrating time dilation of a sinc function waveform, where the original waveform is shown by graph line 34 and the dilated waveform is shown by graph line 36 with the same duration. As is apparent, the time dilated signal is recovered with minimal error.

Figure 4:
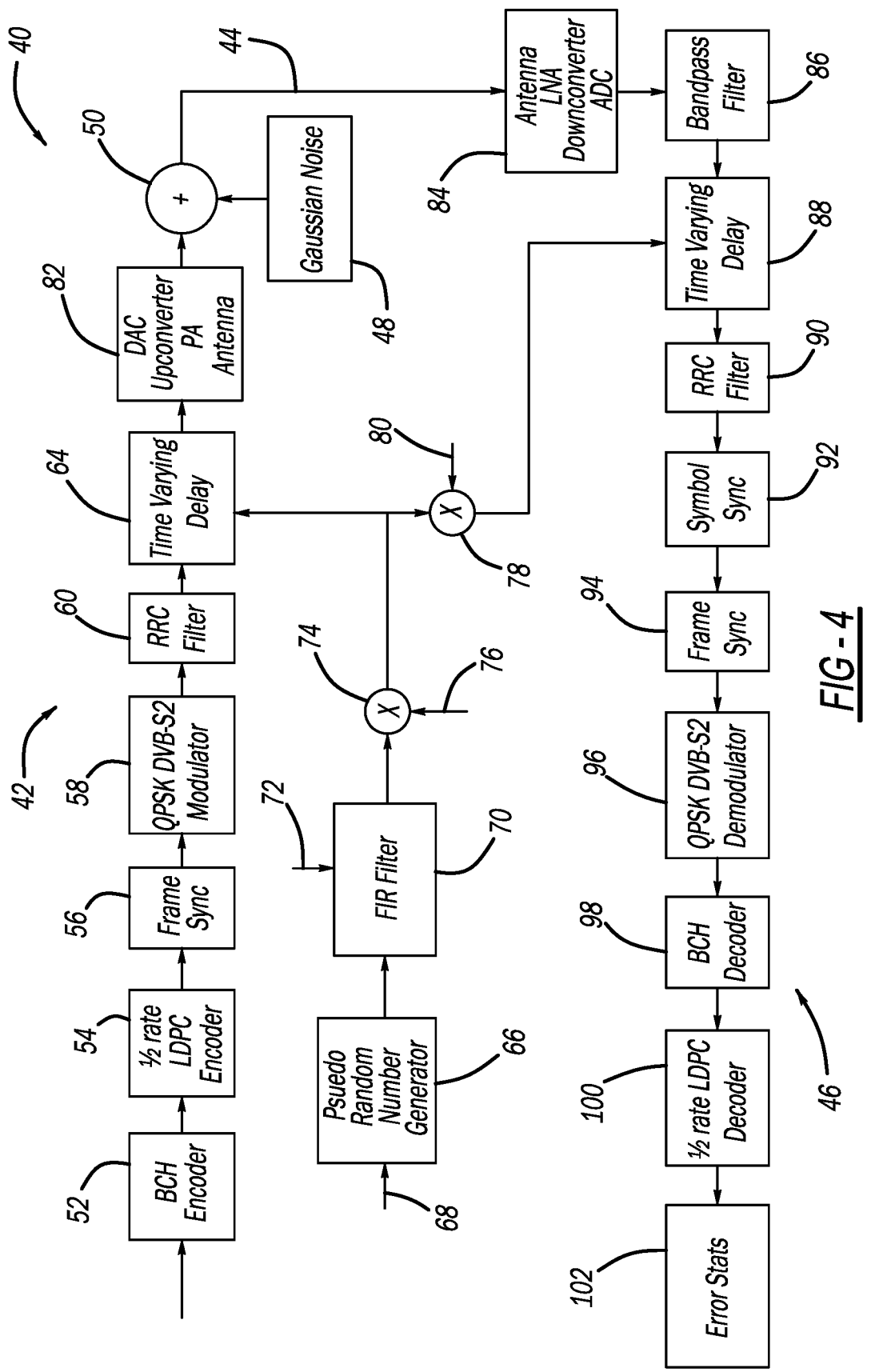
FIG. 4 is a schematic block diagram of a digital communications system that employs a time dilation function (TDF) for dithering transmitted samples.

FIG. 4 is a schematic block diagram of a digital video broadcasting (DVB) system 40 that employs a time dilation function (TDF) as discussed above. It is noted that the DVB system 40 is for illustration purposes only in that the time dilation operation can be employed in any communications system that generates samples for transmission. The system 40 includes a transmitter 42 that transmits the video signals over a wireless communications channel 44 that is received by a receiver 46, where white Gaussian background noise at box 48 is added to the transmitted signal at summation junction 50 as a result of transmission over the channel 44. The transmitter 42 includes a Bose-Chaudhuri-Hocquenghem (BCH) encoder 52 and a half-rate, low density parity check (LDPC) encoder 54 that add error correction bits to provide error correction encoding on a stream of digital bits to be transmitted in a well-known manner. The coded digital bits are sent to a frame synchronizer 56 that provides synchronization for signal lock-on purposes. A DVB-S2 modulator 58 translates the bits into a constellation of bit symbols, for example, using four samples per symbol for quadrature phase shift keying (QPSK) that provides in-phase and quadrature-phase components for each symbol that is transmitted in a manner well understood by those skilled in the art. The samples are then provided to a root raised cosine (RRC) filter 60 for transmission filtering in a well-known manner.

The filtered signal is then sent to a time varying delay processor 64 that applies a TDF to the samples in the manner discussed above. The system 40 generates the TDF using a pseudo random number generator (RNG) 66 that generates a random number between, for example, −1.0 and 1.0, based on an original seed value provided on line 68, where the RNG 66 is provided in both the transmitter 42 and the receiver 46. The random numbers are provided to a finite impulse response (FIR) filter 70 to limit the bandwidth, where the filter 70 receives a center frequency and bandwidth on line 72. The filtered random numbers are then sent to a multiplier 74 that multiplies the numbers by a scale factor on line 76 to generate the TDF. The TDF is multiplied by −1.0 provided on line 80 in the receiver 46 by a multiplier 78. The TDF filtered random numbers are then sent to the delay processor 64 to time dilate the samples, as discussed. The time dilated samples from the processor 64 are converted to an analog signal by a digital-to-analog converter (DAC), the analog signal is then up-converted by an RF up-converter to high frequency, amplified by a power amplifier and transmitted by an antenna at box 82.

The signal is received by an antenna, amplified by a low noise amplifier (LNA), down-converted to a low or intermediate frequency and converted to a digital signal by an analog-to-digital converter (ADC) at box 84 in the receiver 46. The digital signal is then filtered by a bandpass filter 86 and sent to a time varying delay processor 88 that removes the TDF, whose inverse is received from the multiplier 78. The digital signal now including the original symbols is filtered by an RRC filter 90, synchronized by a symbol synchronizer 92 and a frame synchronizer 94, demodulated by a QPSK demodulator 96 to convert the symbols back to bits and decoded by a BCH decoder 98 and an LDPC decoder 100 to remove the error bits in a reverse process to that discussed above in the transmitter 42. The errors performance is then assessed at box 102.

Figure 5:
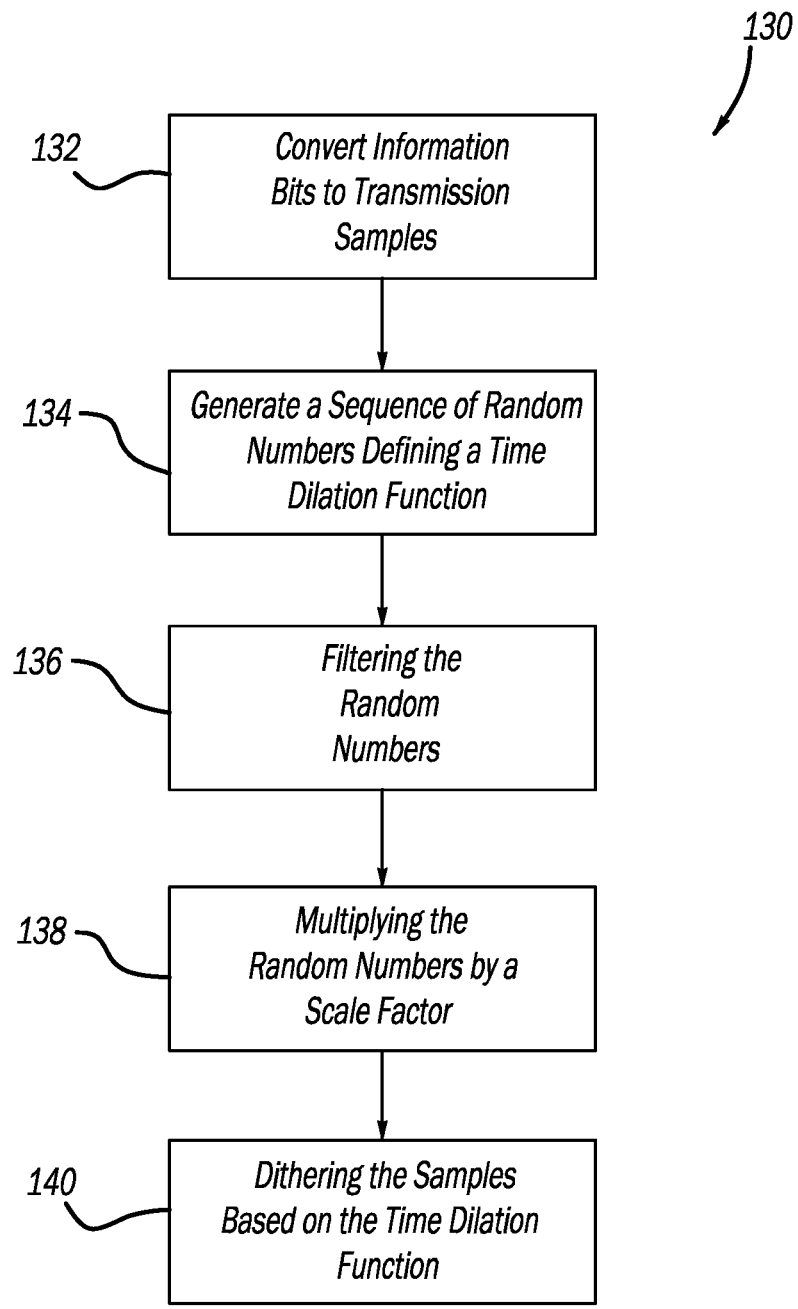
FIG. 5 is a flow chart diagram showing a process for communications that includes dithering samples based on a time dilation function.

FIG. 5 is a flow chart diagram 130 showing a method for communications based on the discussion above. The method converts a series of information bits to transmission samples at box 132, where converting the information bits could include using quadrature phase shift keying modulation that generates four samples per symbol. The method then generates a sequence of random numbers defining a time dilation function at box 134, where generating a sequence of random numbers could include generating random numbers between −1.0 and 1.0, filters the random numbers to limit bandwidth at box 136 and multiplies the random numbers by a scale factor at box 138. The method then dithers the samples in time based on the time dilation function at box 140.

Figure 6:
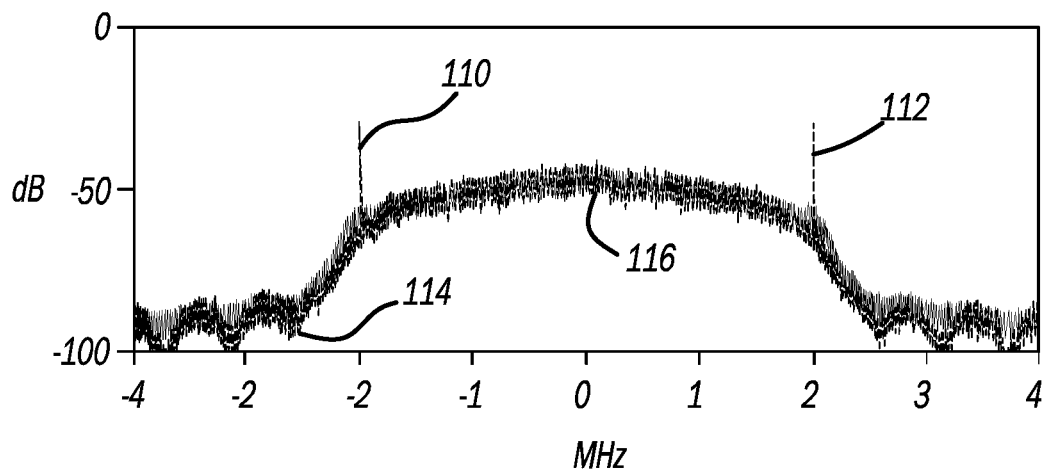
FIG. 6 is a graph with frequency on the horizontal axis and normalized power spectrum on the vertical axis showing that the TDF removes cyclostationary spikes in a signal transmitted using time dilation (TD)-QPSK.

FIG. 6 is a graph with frequency in MHz on the horizontal axis and normalized power spectrum in dB on the vertical axis showing that the above described TDF can be used to remove cyclostationary features 110 and 112 in an original signal represented by graph line 114 transmitted using TD-QPSK, where graph line 116 represents the time dilated signal.

Figure 7:
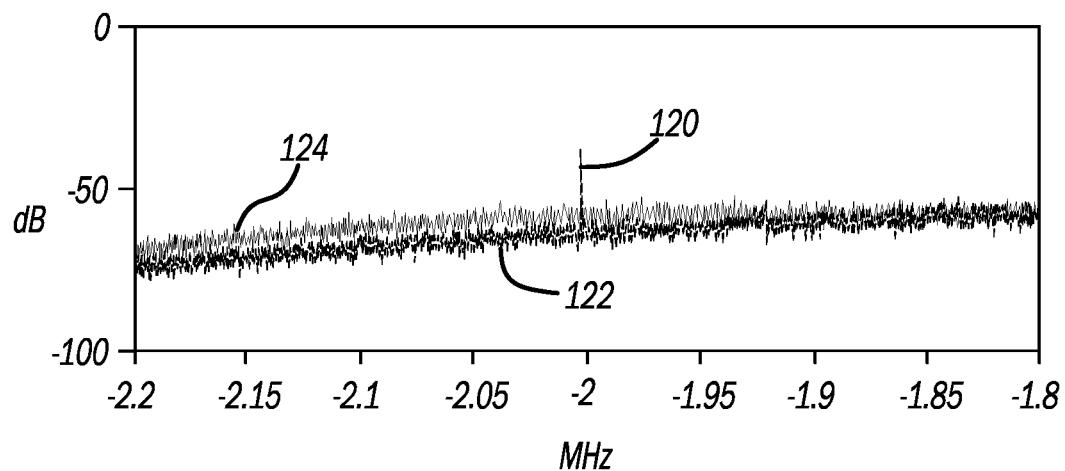
FIG. 7 is a graph with frequency on the horizontal axis and normalized power spectrum on the vertical axis showing that the TDF removes cyclostationary spikes in a signal transmitted using DVB-S2 (second generation satellite) forward error correction (FEC).

FIG. 7 is a graph with frequency in MHz on the horizontal axis and normalized power spectrum in dB on the vertical axis, i.e., a zoomed in view of FIG. 5, showing that the above described TDF can be used to remove cyclostationary features 120 in an original signal represented by graph line 122 transmitted using DVB-S2 FEC, where graph line 124 represents the time dilated signal.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A communications system comprising:
    a modulator that converts a series of information bits to transmission samples;
    a pseudo random number generator that generates a sequence of random numbers defining a time dilation function; and
    a time varying delay processor responsive to the samples and the time dilation function, said time varying delay processor dithering the samples in time based on the time dilation function.

2. The system according to claim 1 further comprising a filter that limits bandwidth before the random numbers are sent to the time varying delay processor.

3. The system according to claim 1 further comprising a multiplier for multiplying the random numbers by a scale factor before the random numbers are sent to the time varying delay processor.

4. The system according to claim 1 wherein the pseudo random number generator generates random numbers between −1.0 and 1.0.

5. The system according to claim 1 wherein the modulator provides quadrature phase shift keying modulation.

6. The system according to claim 5 wherein the modulator generates four samples per symbol.

7. The system according to claim 1 wherein the information bits include video data.

8. A communications system comprising:
    a transmitter including a modulator that converts a series of information bits to transmission samples, a transmitter pseudo random number generator that generates a sequence of transmitter random numbers defining a time dilation function, and a transmitter time varying delay processor responsive to the samples and the time dilation function, said transmitter time varying delay processor dithering the samples in time based on the time dilation function, said transmitter transmitting the dithered samples; and
    a receiver responsive to the dithered samples from the transmitter, said receiver including a receiver pseudo random number generator that generates a sequence of receiver random numbers in sync with the transmitter random numbers, a receiver time varying delay processor responsive to the receiver random numbers and the dithered samples, said receiver time varying delay processor removing the dithering of the samples, and a demodulator for demodulating the samples to recover the information bits.

9. The system according to claim 8 further comprising a filter in both the transmitter and the receiver that limits bandwidth before the random numbers are sent to the time varying delay processor.

10. The system according to claim 8 further comprising a multiplier in both the transmitter and the receiver for multiplying the random numbers by a scale factor before the random numbers are sent to the time varying delay processor.

11. The system according to claim 8 wherein the pseudo random number generators generate random numbers between −1.0 and 1.0.

12. The system according to claim 8 wherein the modulator provides quadrature phase shift keying modulation.

13. The system according to claim 12 wherein the modulator generates four samples per symbol.

14. The system according to claim 8 wherein the information bits include video data.

15. A method for communications comprising:
    converting a series of information bits to transmission samples;
    generating a sequence of random numbers defining a time dilation function; and
    dithering the samples in time based on the time dilation function.

16. The method according to claim 15 further comprising filtering the random numbers to limit bandwidth before the random numbers dither the samples.

17. The method according to claim 15 further comprising multiplying the random numbers by a scale factor before the random numbers dither the samples.

18. The method according to claim 15 wherein generating a sequence of random numbers includes generating random numbers between −1.0 and 1.0.

19. The method according to claim 15 wherein converting a series of information bits to transmission samples includes using quadrature phase shift keying modulation.

20. The method according to claim 19 wherein the quadrature phase shift keying modulation generates four samples per symbol.

* * * * *